United States Patent
Gac et al.

[11] Patent Number: 6,106,045
[45] Date of Patent: Aug. 22, 2000

[54] CAB BACK TRIM PANEL FOR PICK-UP TRUCK APPLICATION WITH EXHAUSTER AND NVH IMPROVEMENTS

[75] Inventors: Gregory E. Gac, Troy; Dragi Jovan, Commerce; Joe Corrigan, Troy, all of Mich.

[73] Assignee: DaimlerChrysler Corporation, Auburn Hills, Mich.

[21] Appl. No.: 09/302,723

[22] Filed: Apr. 30, 1999

[51] Int. Cl.⁷ .......................... B60R 13/02; B60R 13/08
[52] U.S. Cl. .................. 296/39.1; 296/39.3; 296/190.09; 296/208; 454/164
[58] Field of Search .............................. 296/190.09, 39.1, 296/39.3, 208; 454/162, 164, 165

[56] References Cited

U.S. PATENT DOCUMENTS

| | | |
|---|---|---|
| 4,480,868 | 11/1984 | Koto . |
| 4,721,031 | 1/1988 | Nakata et al. .......................... 296/190 |
| 4,971,380 | 11/1990 | Cote et al. . |
| 5,085,482 | 2/1992 | Moehlman et al. . |
| 5,542,737 | 8/1996 | Madden ................................. 296/180.1 |
| 5,921,619 | 7/1999 | Cederberg et al. ................. 296/190.09 |

*Primary Examiner*—D. Glenn Dayoan
*Assistant Examiner*—Paul Chenevert
*Attorney, Agent, or Firm*—Roland A. Fuller, III

[57] ABSTRACT

A trim panel for mounting to a cabin wall of a vehicle, wherein the cabin wall includes an exhauster for relieving pressure within the cabin of the vehicle and a child-seat anchor for retaining a child seat. The trim panel includes a generally rigid support structure mounted to the cabin wall. The support structure includes a front surface and a rear surface. A plurality of channels is disposed on the rear surface of the support structure. These channels generally extend from a position adjacent the exhauster to an edge of the support structure. These channels further cooperate with the cabin wall of the vehicle to define a plurality of airflow paths between the cabin and the exhauster. More preferably, the trim panel of the present invention includes a sound-insulating membrane molded within the support structure for minimizing sound infiltration from the exhauster into the cabin.

14 Claims, 3 Drawing Sheets

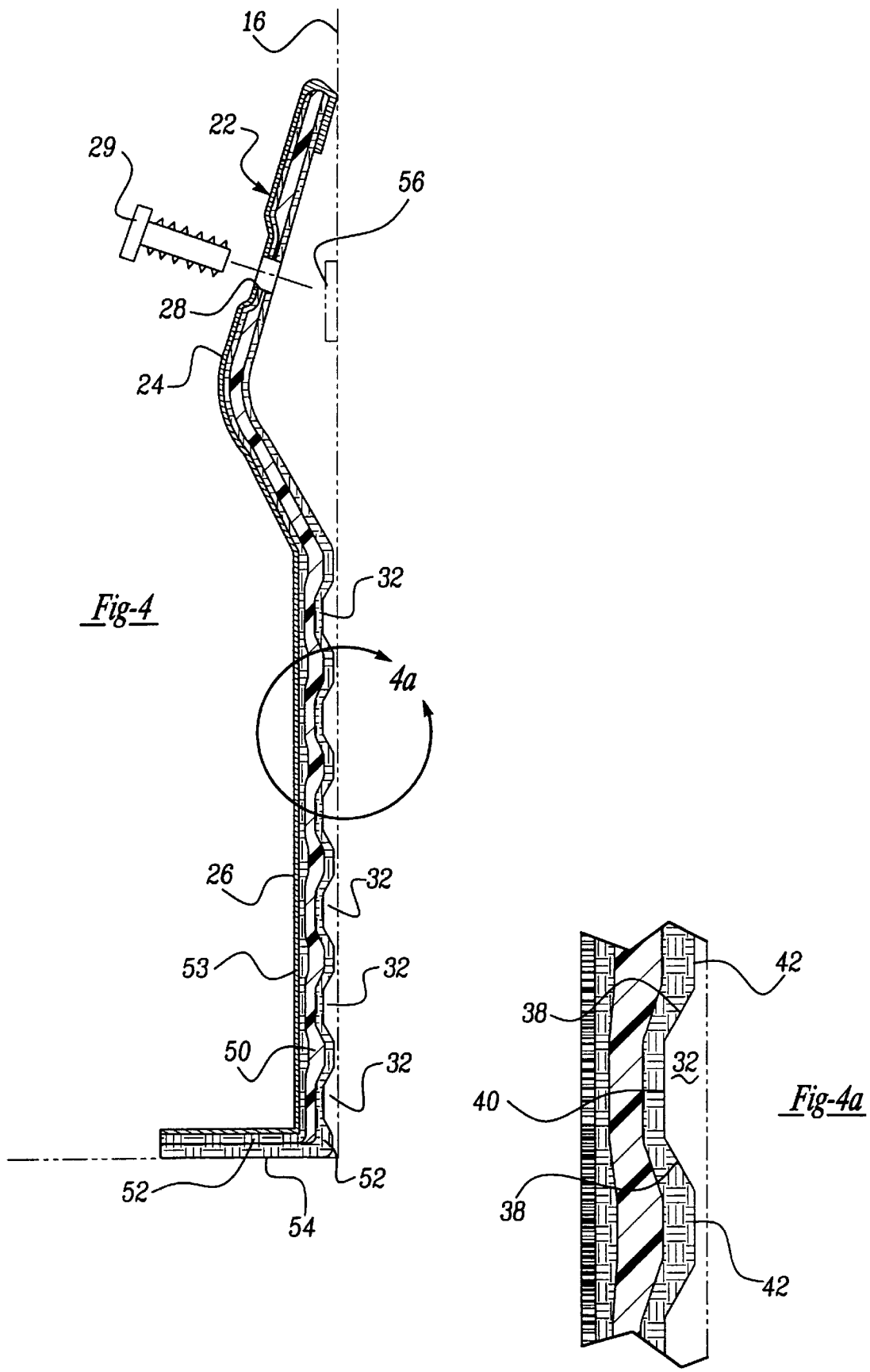

6,106,045

CAB BACK TRIM PANEL FOR PICK-UP TRUCK APPLICATION WITH EXHAUSTER AND NVH IMPROVEMENTS

CROSS-REFERENCE TO RELATED APPLICATIONS

The present invention is related to the following co-pending U.S. patent application, which is incorporated herein by reference:

U.S. Ser. No. 09/303,507 for an invention entitled "SEAT BACK CAB BACK TRIM PANEL FOR PICK-UP TRUCK APPLICATION WITH EXHAUSTER AND CHILD TETHER PROVISIONS."

FIELD OF THE INVENTION

The present invention relates to automotive trim panels and, more particularly, to a trim panel for a pick-up truck having airflow channels for improving ventilation and a sound insulating membrane for reducing NVH (noise, vibration, and harshness).

BACKGROUND OF THE INVENTION

As is well known, many modern vehicles are designed and manufactured to produce a relatively airtight passenger cabin to minimize road noise. However, due to the efficient sealing of these cabins, passengers may experience a sudden pressure burst when a vehicle door is shut or the vehicle ventilation system is activated. Accordingly, vehicle manufactures have traditionally employed cabin exhausters to allow this pressure inside the cabin to be quickly exhausted outside the vehicle. These exhausters are commonly seen in vehicle door jams. However, it should be appreciated that the size of these exhausters is restricted due to the area available in these door jams locations.

Recently, there has been a trend in many vehicles, such as pick-up trucks, to position exhausters in the rear, sheet metal wall of the cabin, also known as the cab back. This location affords greater flexibility in exhauster design; namely, this location enables the size of the exhausters to be maximized to increase airflow. However, it should be appreciated to those skilled in the art that this mounting position in the cab back provides a direct path for noise infiltration into the passenger cabin. This direct noise path may also increase the level of vibration and harshness experienced in the passenger cabin. Furthermore, mounting of conventional trim panels against the cab back may limit the airflow from the cabin to the exhausters.

Accordingly, there exists a need in the relevant art to provide a cab back trim panel that is capable of providing sufficient air exchange between the passenger cabin and the exhausters. Furthermore, there exists a need in the relevant art to provide a trim panel that is capable of minimizing the noise, vibration, and harshness (NVH) that enter the passenger compartment through the exhausters.

SUMMARY OF THE INVENTION

In accordance with the broad teachings of this invention, a trim panel for mounting to a cabin wall of a vehicle having an advantageous construction is provided. The cabin wall includes an exhauster for relieving pressure within the cabin of the vehicle. The trim panel includes a generally rigid support structure mounted to the cabin wall. The support structure includes a front surface and a rear surface. A plurality of channels is disposed on the rear surface of the support structure. These channels generally extend from a position adjacent the exhauster to an edge of the support structure. These channels further cooperate with the cabin wall of the vehicle to define a plurality of airflow paths between the cabin and the exhauster. More preferably, the trim panel of the present invention includes a sound-insulating membrane molded within the support structure for minimizing sound infiltration from the exhauster into the cabin.

Further areas of applicability of the present invention will become apparent from the detailed description provided hereinafter. It should be understood that the detailed description and specific examples, while the indicating preferred embodiment of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 4 is a cross-sectional view of the trim panel taken along line 4—4 of FIG. 2; and FIG. 4a is an enlarged cross-sectional view of FIG. 4.

DETAILED DESCRIPTION OF THE PREFERRED EMBODIMENTS

Figure 1:
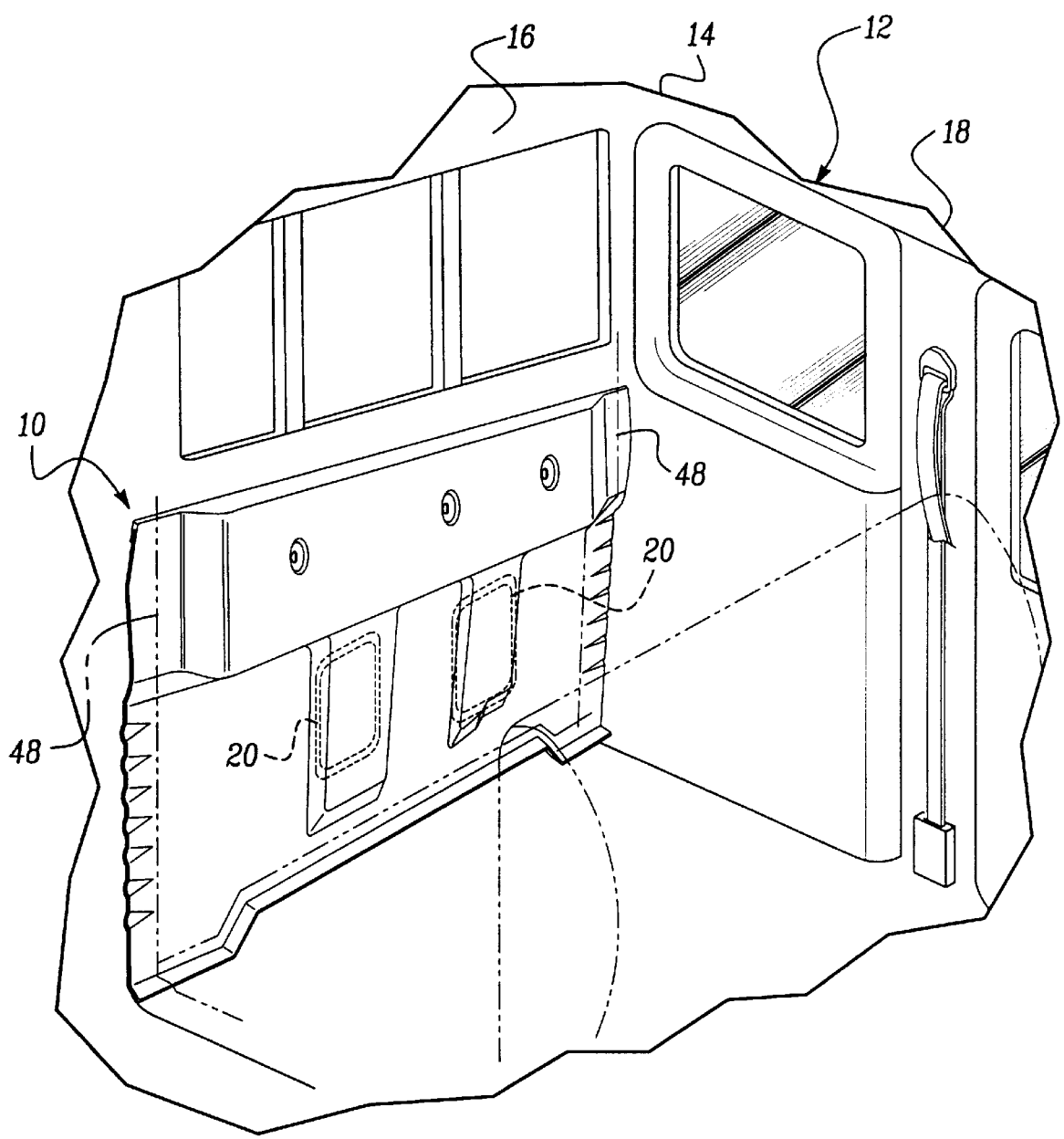
FIG. 1 is a perspective view of a passenger cabin of a pick-up truck having the trim panel of the present invention.

The following description of the preferred embodiment is merely exemplary in nature and is in no way intended to limit the invention, its application, or uses. For example, the trim panel disclosed herein may have utility in a variety of vehicle applications.

Referring to the drawings, a trim panel 10 is shown incorporated in a passenger cabin 12 of a pick-up truck 14. Cabin 12 generally includes a rear wall 16, a pair of sidewall 18 (only one shown), and a front wall or windshield (not shown). Rear wall 16 is preferably made of sheet metal and includes a pair of exhausters 20 (shown hidden). Exhausters 20 are adapted for releasing cabin pressure upon detection of a pressure increase such as during closure of a vehicle door or activation of the vehicle ventilation system. Preferably, exhausters 20 are rubber flaps held closed by gravity that open when subjected to a predetermined pressure differential. It should be appreciated that the predetermined relief pressure and size of exhausters 20 are dependent upon the specific vehicle for which the exhausters are to be used.

Figure 2:
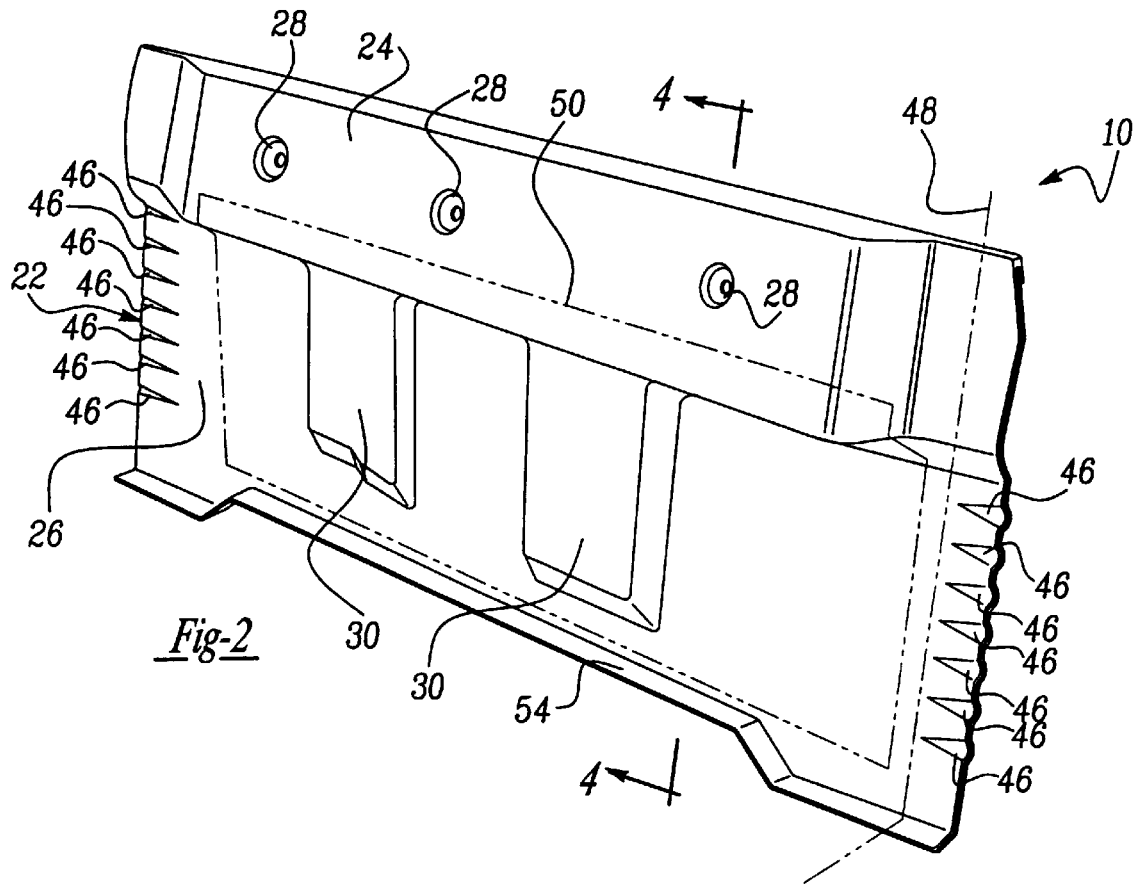
FIG. 2 is a front perspective view of the trim panel illustrating the plurality of edge notches.
Figure 3:
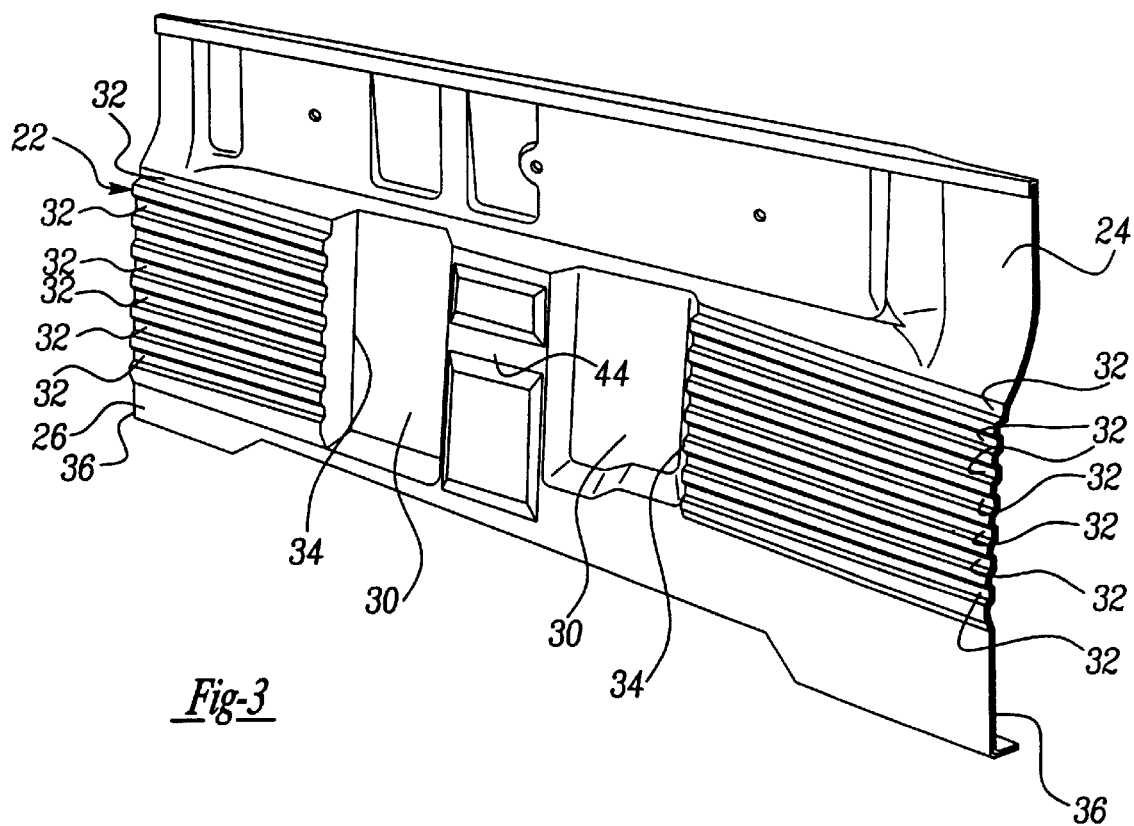
FIG. 3 is a rear respective view of the trim panel illustrating the plurality of air channels.

As best seen in FIGS. 2–4, trim panel 10 includes a support structure 22. Support structure 22 includes a convex portion 24 and a generally planar portion 26. Convex portion 24 is disposed above planar portion 26 and provides a generally aesthetic surface. It should be appreciated that convex portion 24 may be any shape dictated by interior cabin design. Convex portion 24 includes a plurality of mounting apertures 28 for receiving a suitable fastener 29 (FIG. 4). These fasteners are adapted to secure trim panel 10 to rear wall 16 of vehicle 14, as described in detail below.

Planar portion 26 includes a pair of protrusions 30. Protrusions 30 are generally rectangular shaped to cooperate with exhausters 20. That is, protrusions 30 are sized to be larger than exhausters 20 to insure that airflow through exhausters 20 is not impeded by support structure 22. It is anticipated that protrusions 30 may be eliminated if additional space in front of exhausters 20 is not needed for proper operation. Additionally, protrusions 30 may also be eliminated if a substantially flat lower surface is preferred for improved aesthetic quality.

As best seen in FIGS. 3, 4, and 4a, planar portion 26 of support structure 22 includes a plurality of horizontally disposed airflow channels 32. Airflow channels 32 generally extend from an outboard edge 34 of each protrusion 30 to opposing outboard edges 36 of support structure 22. As seen in FIG. 4a, each airflow channel 32 includes a pair of sloping sides 38 interconnecting a generally flat lower portion 40 and a generally flat upper portion 42. Preferably, each airflow channel 32 is approximately ¼ inch deep to provide a combined total of approximately 9 square inches of airflow per exhauster 20. It should be noted that although airflow channels 32 are provided on the rear of support structure 22, these channels are not present on the front of support structure 22. This arrangement provides a generally continuous plane for improved aesthetics.

Planar portion 26 of support structure 22 further includes an intermediate airflow channel 44 extending between protrusions 30. Intermediate airflow channel 44 insures that each exhauster 20 is properly balanced relative to the other. Proper balancing of exhausters 20 enables airflow from passenger cabin 12 to be maximized.

Still further, planar portion 26 includes a plurality of airflow notches 46 disposed on the front of outboard edges 36 of support structure 22. Each airflow notch 46 provides an airflow path extending from the front of support structure 22 to corresponding airflow channels 32 on the rear of support structure 22. It should be appreciated that each airflow notch 46 is generally formed as a result of molding airflow channels 32 along edges 36. Airflow notches 46 are covered by adjacent side trim panels 48 (shown in phantom in FIGS. 1 and 2) extending along the B-pillars of the pick-up truck. This arrangement conceals airflow notches 46 from view after assembly.

As best seen in FIG. 4, support structure 22 is preferably made of a molded composite material bonded with a resin material. More particularly, support structure 22 includes a sound-insulating membrane 50 (FIGS. 2 and 4) disposed between opposing layers of recycled cotton material 52, also known as cotton shoddy. Preferably, sound-insulating membrane 50 is ethyl vinyl acetate (EVA). More preferably, the EVA is ½ pounds per cubic foot, the cotton shoddy is 65 grams per cubic foot (dry weight), and the resin is a polyester resin.

In order to minimize the cost of the EVA, the EVA is only provided generally near exhausters 20 (see FIG. 2). It has been found that extending the EVA past this general area does not provide a substantial reduction in noise insulation. The EVA and cotton shoddy are molded with heat and pressure in a known manner to conform to the shape of a die mold. After the molding of support structure 22, a carpet layer 53 extends around the front surface of support structure 22 in accordance with the interior design of the pick-up truck.

Referring to FIGS. 2 and 4, a flange 54 extends from a lower portion of support structure 22. Flange 54 cooperates with the interior flooring of the vehicle to retain trim panel 10 in position. That is, the flooring lays on top of flange 54, thereby holding trim panel 10 against rear wall 16.

During installation, trim panel 10 is positioned adjacent to the rear wall 16 such that fasteners 29 extend through mounting apertures 28 and are received within a plurality of corresponding holes 56 formed in rear wall 16. This arrangement enables support structure 22 to be secured on rear wall 16 adjacent to the exhausters 20. It is anticipated that fasteners 29 may be replaced with a mounting bracket (not shown) for use with a child safety seat.

The trim panel according to the present invention enables improvements in air ventilation in the cabin of pick-up trucks to be realized. That is, the trim panel of the present invention provides a plurality of unobstructed air passages between the cabin and the enlarged exhausters for improved air ventilation. Moreover, the trim panel of the present invention minimizes noise infiltration from entering the passenger cabin.

The invention being thus described, it will be obvious that the same may be varied in many ways. Such variations are not to be regarded as a departure from the spirit and scope of the invention. Such variations or modifications, as would be obvious to one skilled in the art, are intended to be included within the scope of the following claims.

What is claimed is:

1. A trim panel for mounting to a cabin wall in a motor vehicle, said cabin wall having an exhauster for relieving pressure within the cabin of said vehicle, said panel comprising:

a generally rigid support structure mountable to the cabin wall adjacent the exhauster, said support structure having a front surface and a rear surface; and a plurality of channels being disposed on said rear surface of said support structure, said plurality of channels generally extending from a position adjacent the exhauster to an edge of said support structure, said plurality of channels adapted to cooperate with the cabin wall of the vehicle to define a plurality of airflow paths between the cabin and the exhauster.

2. The trim panel according to claim 1, further comprising:

a sound-insulating material being integrally formed with said support structure for minimizing sound infiltration from the exhauster into the cabin.

3. The trim panel according to claim 2 wherein said sound-insulating member is formed from a composite material.

4. The trim panel according to claim 3 wherein said composite material is comprised of an ethyl vinyl acetate layer bonded to a cotton shoddy layer using a polyester resin.

5. The trim panel according to claim 1, further comprising:

a plurality of notches formed on at least one edge of said front surface of said support structure, said plurality of notches cooperating with said plurality of channels to enable air to flow around said edge of said support structure to said plurality of channels formed on said rear surface of said support structure.

6. The trim panel according to claim 5 wherein said front surface of said support structure defines generally a continuous plane.

7. A trim panel for mounting to a cabin wall in a motor vehicle, said cabin wall having an exhauster for relieving pressure within the cabin of said vehicle, said panel comprising:

a generally rigid support structure mountable to the cabin wall adjacent the exhauster, said support structure having a front surface and a rear surface;

a plurality of channels being disposed on said rear surface of said support structure, said plurality of channels generally extending from a position adjacent the exhauster to an edge of said support structure, said plurality of channels adapted to cooperate with the cabin wall of the vehicle to define a plurality of airflow paths between the cabin and the exhauster; and a sound-insulating material being integrally formed with said support structure for minimizing sound infiltration from the exhauster into the cabin.

8. The trim panel according to claim 7 wherein said sound-insulating member is formed from a composite material.

9. The trim panel according to claim 8 wherein said composite material is comprised of an ethyl vinyl acetate layer bonded between a pair of cotton shoddy layers using a polyester resin.

10. The trim panel according to claim 7, further comprising:

a plurality of notches formed on at least one edge of said front surface of said support structure, said plurality of notches cooperating with said plurality of channels to enable air to flow around said edge of said support structure to said plurality of channels formed on said rear surface of said support structure.

11. The trim panel according to claim 10 wherein said front surface of said support structure defines generally a continuous plane.

12. A trim panel for mounting to a cabin wall in a motor vehicle, said cabin wall having an exhauster for relieving pressure within the cabin of said vehicle, said panel comprising:

a generally rigid support structure mountable to the cabin wall adjacent the exhauster, said support structure having a front surface and a rear surface, said front surface defining a generally continuous plane;

a plurality of channels being disposed on said rear surface of said support structure, said plurality of channels generally extending from a position adjacent the exhauster to an edge of said support structure, said plurality of channels adapted to cooperate with the cabin wall of the vehicle to define a plurality of airflow paths between the cabin and the exhauster; and a composite material being integrally formed with said support structure for minimizing sound infiltration from the exhauster into the cabin.

13. The trim panel according to claim 12 wherein said composite material is comprised of an ethyl vinyl acetate layer bonded to a cotton shoddy layer using a polyester resin.

14. The trim panel according to claim 12, further comprising:

a plurality of notches formed on at least one edge of said front surface of said support structure, said plurality of notches cooperating with said plurality of channels to enable air to flow around said edge of said support structure to said plurality of channels formed on said rear surface of said support structure.

* * * * *